United States Patent
Kaluzhny

(10) Patent No.: US 9,857,988 B1
(45) Date of Patent: Jan. 2, 2018

(54) DATA MANAGEMENT IN MULTIPLY-WRITEABLE FLASH MEMORIES

(71) Applicant: WINBOND ELECTRONICS CORPORATION, Taichung (TW)

(72) Inventor: Uri Kaluzhny, Beit Shemesh (IL)

(73) Assignee: WINBOND ELECTRONICS CORPORAITON, Taichung (TW)

( * ) Notice: Subject to any disclaimer, the term of this patent is extended or adjusted under 35 U.S.C. 154(b) by 17 days.

(21) Appl. No.: 15/206,277

(22) Filed: Jul. 10, 2016

(51) Int. Cl.
G06F 12/02 (2006.01)
G06F 3/06 (2006.01)

(52) U.S. Cl.
CPC .......... *G06F 3/061* (2013.01); *G06F 3/0655* (2013.01); *G06F 3/0688* (2013.01); *G06F 12/0246* (2013.01)

(58) Field of Classification Search
CPC ................................................ G06F 12/0246
See application file for complete search history.

(56) References Cited

U.S. PATENT DOCUMENTS

| | | | | |
|---|---|---|---|---|
| 2008/0270681 A1* | 10/2008 | Van Acht | ............ | G06F 12/0246 711/103 |
| 2008/0276036 A1* | 11/2008 | Van Acht | ............ | G06F 12/0246 711/103 |
| 2010/0082883 A1* | 4/2010 | Chen | .................... | G06F 12/0246 711/103 |
| 2010/0299494 A1* | 11/2010 | Van Acht | ............ | G06F 12/0246 711/166 |
| 2011/0078363 A1* | 3/2011 | Yeh | ..................... | G06F 12/0246 711/103 |
| 2011/0264859 A1* | 10/2011 | Yano | .................... | G06F 12/0246 711/118 |
| 2013/0332648 A1* | 12/2013 | Kandiraju | ........... | G06F 12/0246 711/103 |
| 2015/0149692 A1* | 5/2015 | Wang | ................... | G06F 12/0253 711/103 |

* cited by examiner

*Primary Examiner* — Edward Dudek, Jr.
(74) *Attorney, Agent, or Firm* — Soroker Agmon Nordman

(57) ABSTRACT

According to the present disclosure is provided a device and method for mapping management in a flash memory based on partitioning the memory to a main address space and a substitute space, each partition comprising locations in the memory that are denoted by at least three statues according to which locations are mapped from the main space to the substitute space while responsively modifying the statuses.

5 Claims, 4 Drawing Sheets

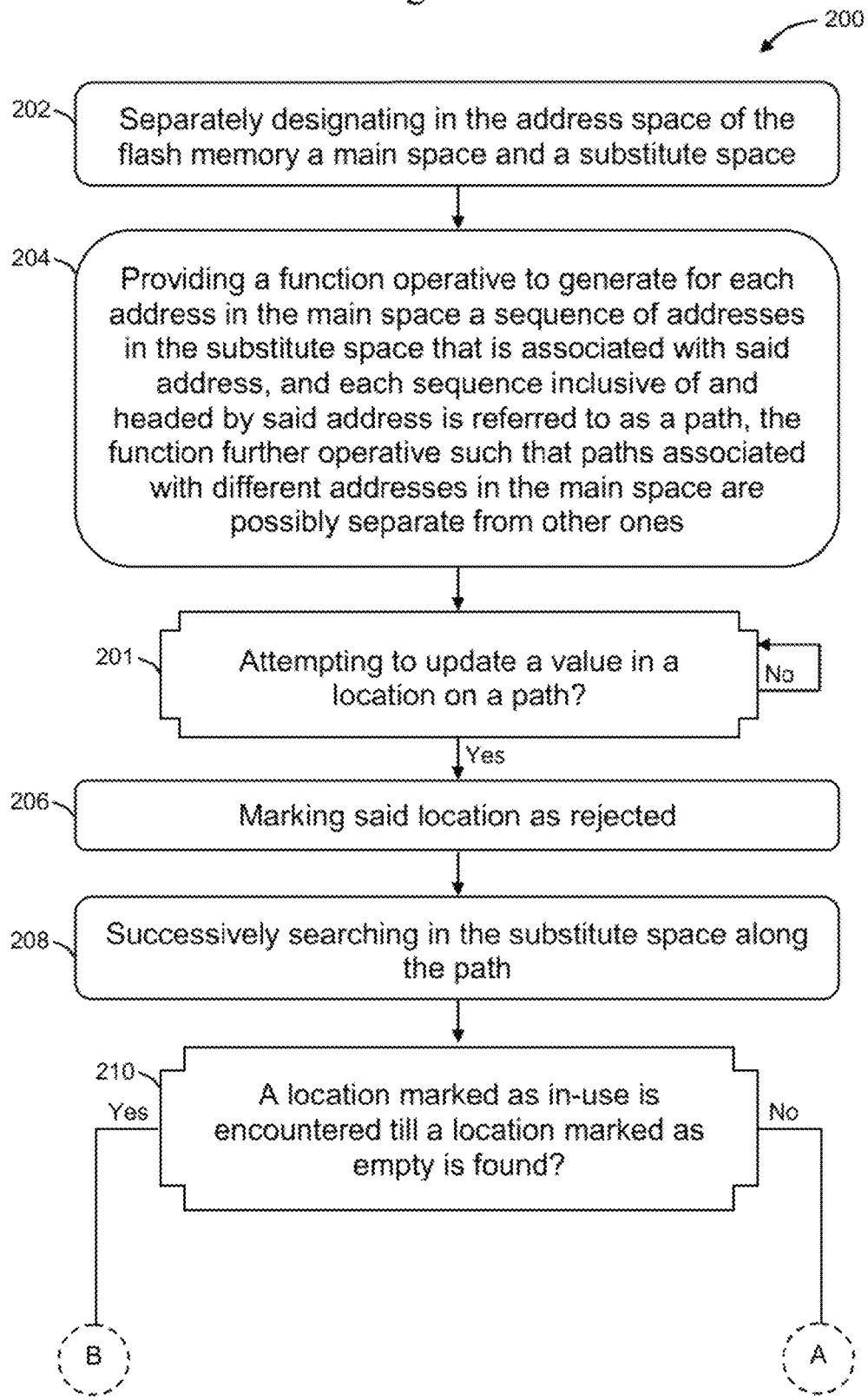

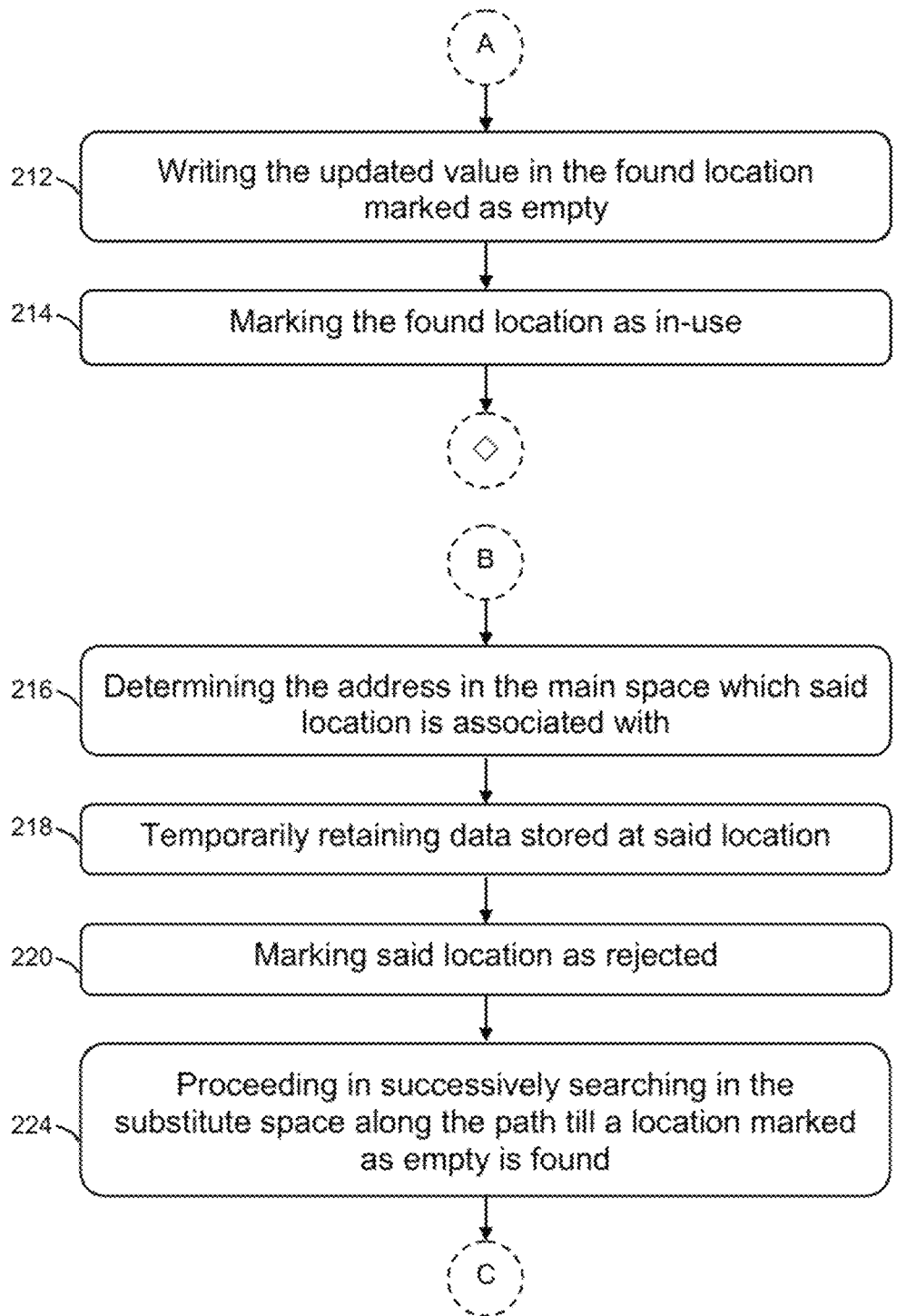
Fig. 2 (continuation)

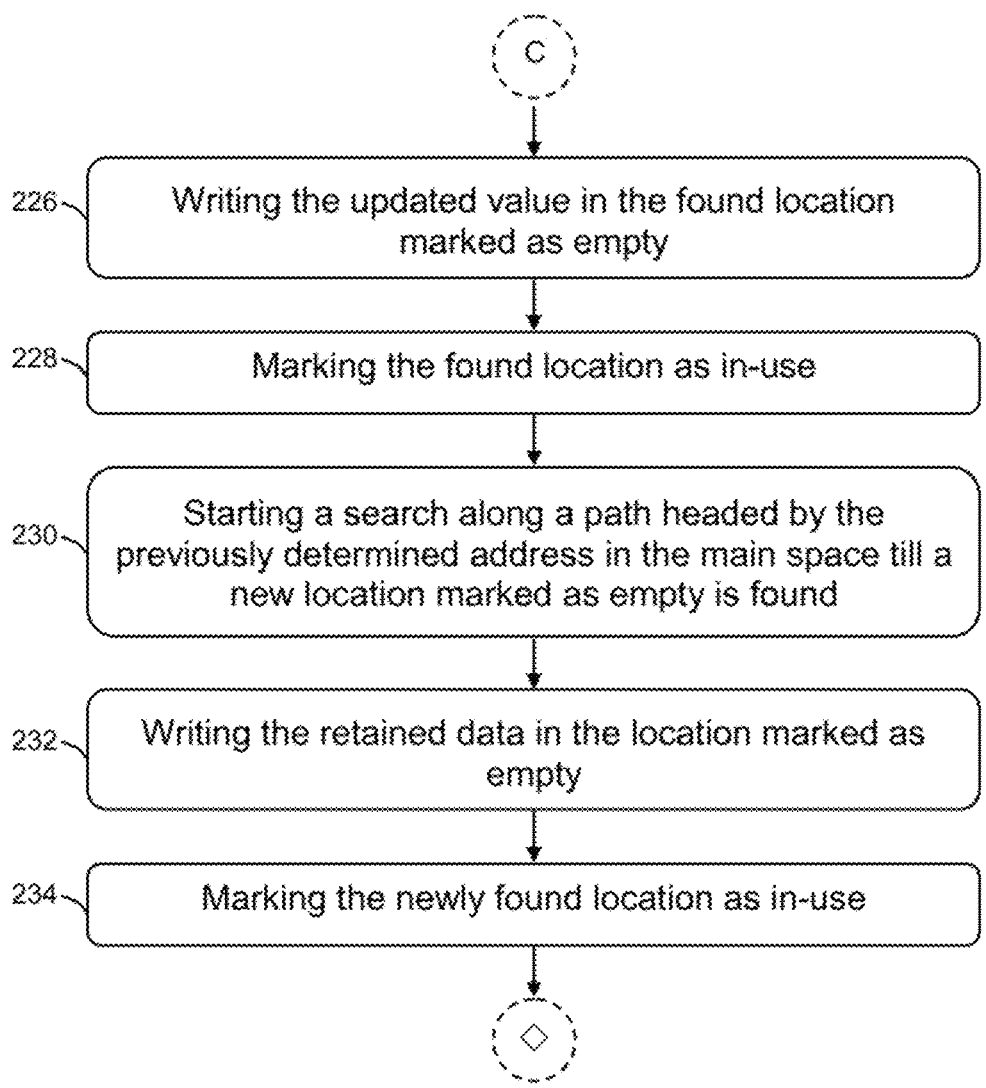
Fig. 2 (continuation)

DATA MANAGEMENT IN MULTIPLY-WRITEABLE FLASH MEMORIES

BACKGROUND

The present disclosure generally relates to flash memories, and more specifically to mapping addresses of flash memories to other addresses.

Contemporary flash memories have a restrictive property that the 'erase' operation is expensive in terms such as time and affects large memory areas relative to elements such as bits or bytes. Therefore, to update even a single entry in a data array, one often has to copy the entire array to another location and update the entry in the copied array as if—virtually—the original array is updated and associate the new location with the address of the array as a mapped address of the array. Subsequently, the array in the original location might be erased such as for further use.

If each physical location can be mapped to one logical address only, then the memory management is quite straightforward, but the number of times that data can be rewritten is limited. For example, if one has two spare locations for each logical address, then the size of the spare array is twice as the original array and the original array address can be rewritten or updated only twice.

It is also noted that in such a manner it may occur that most of the spare memory remains unused up to the moment when no more modifications can be done for a required address, since, typically at least, the changes throughout the array are unpredictable.

Mapping regions of flash memories to substitutional or a logical addresses is known in the art as in, for example, http://web.stanford.edu/~ouster/cgi-bin/cs140-winter13/lecture.php?topic=flash.

Generally, or in various cases, mapping an original physical address to a virtual or a substitutional one entails that the original address should be retained and maintained to keep track of the mapping, at the expense of storage capacity.

SUMMARY

One exemplary embodiment of the disclosed subject matter is a method for data management in a device having a flash memory and capable of multiple overwrites without erasing, and operative in an address space of the flash memory formed as an array of locations respective to addresses, each of the locations having statuses that can be marked as either "empty" or "in-use" or "rejected" and entirely initialized to the empty status, the method comprising:

(i) separately designating in the address space a main space and a substitute space exclusively of each other, where locations respective to addresses in the substitute space may serve as substitute locations for addresses in the main space, (ii) providing a function operative to generate for each address in the main space a sequence of addresses in the substitute space, each sequence inclusive of and headed by said address in the main space is referred to as a path, the function further operative such that paths generated for different addresses in the main space are not necessarily isolated from each other so that some paths may have some shared locations, (iii) responsive to attempting to read a value stored in a location respective to an address in the main space, searching for the first location not marked as rejected on a path generated for the said address, the searched-for location being a current substitute location for the said address, and returning the value stored in the current substitute location as the value for said address in the main space, (iv) responsive to attempting to update a value stored in a location respective to an address in the main space, marking the current substitute location for this address as rejected, and further searching in the substitute space along the path for a new substitute location, and if no location marked as in-use is encountered till a location marked as empty is found, then consequently writing the updated value in the found location marked as empty and marking the found location as in-use, thus making this new location the current substitute location for the said address in the main space, (v) otherwise, if during the search a location marked as in-use is encountered, then determining the address in the main space for which the encountered location serves as the current substitute location and temporarily purging the encountered data from the encountered location, while retaining the pair of address and stored data of the encountered location for future processing and marking said encountered location as rejected, and proceeding with the search along the path, thereafter commencing the search for new substitute locations for all purged pairs of addresses and data, and (vi) thus the flash memory device provides that the path in the substitute space headed by an address in the main space is made up of a location marked as in-use, possibly preceded by a series of locations marked as rejected, where the location marked as in-use serving as a unique substitutional location for the location respective to the address in the main space at the head of the path, wherein the method is continuously carried out by at least a processing component embedded in the device.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1:
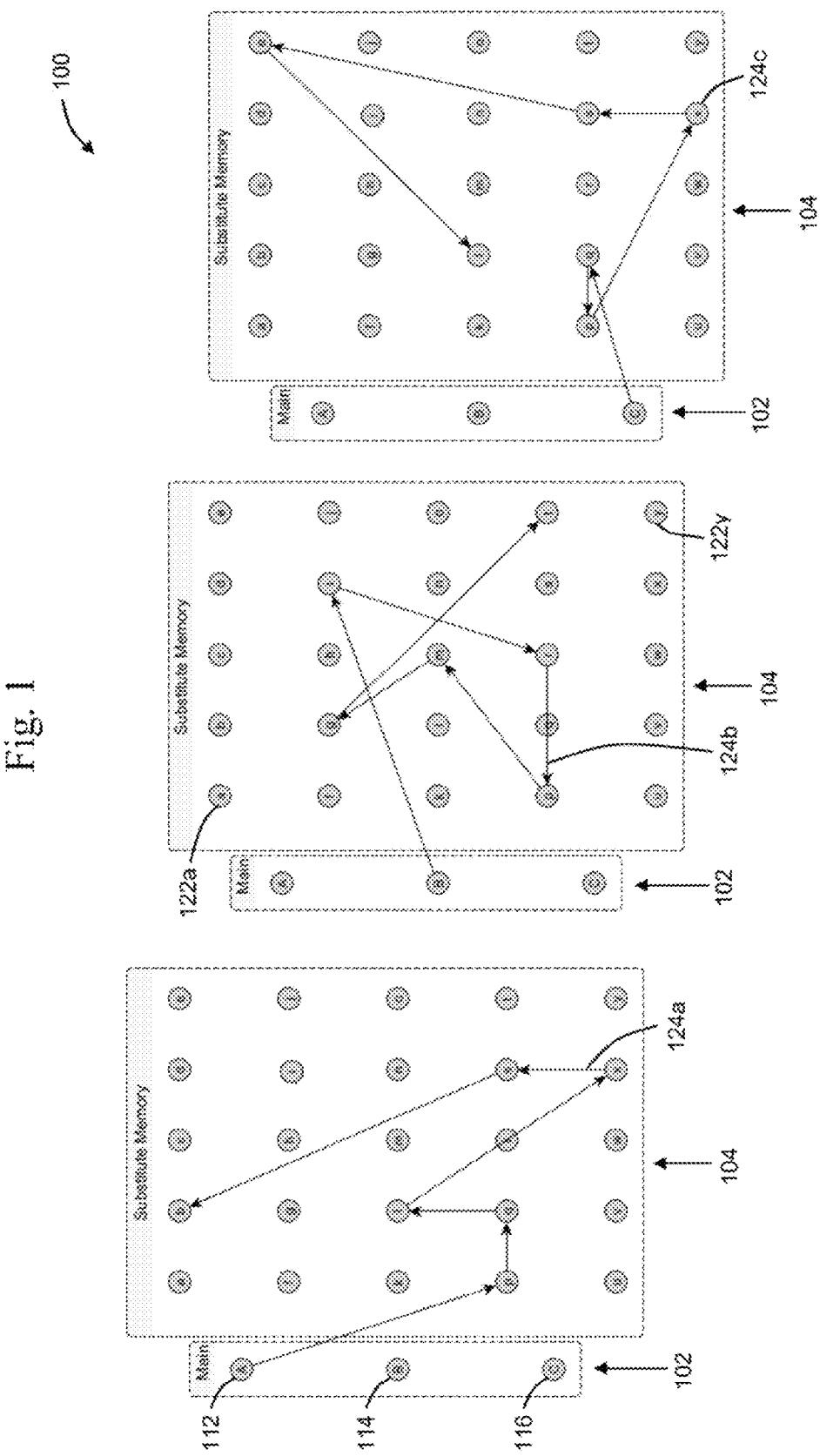

References to previously presented elements are implied without necessarily further citing the drawing or description in which they appear.

FIG. 1 schematically illustrates an arrangement for mapping management in a flash memory, according to exemplary embodiments of the disclosed subject matter, and FIG. 2 outlines operations in management of addresses mapping in a device of a flash memory, according to exemplary embodiments of the disclosed subject matter.

DETAILED DESCRIPTION

In the context of the present disclosure, without limiting, mapping of a first address to a second address in a memory implies assigning the second address to serve as substitute address in lieu of the first address.

In the context of some embodiments of the present disclosure, without limiting, an original address or an original location refers to a physical address or a location in a region of a memory that is not yet mapped to another address and/or may further be mapped to another address in a different region, as opposed to a mapped address or a location that serve as a substitute or an alternative to an original address or a location.

For brevity and clarity and without limiting, in the present disclosure and unless otherwise specified referring to a memory implies a flash memory.

In the context of the present disclosure, without limiting, referring to a segment of a memory, or shortly a segment, implies an aggregate or an array of memory data, such as a block or a page as known in the art of flash memories. For brevity and clarity and without limiting, the segment is not specified and is assumed according to the role thereof and/or operations applied thereto.

In the context of the present disclosure, without limiting, referring to a location, as in a location of the memory, implies a data item of the memory that is individually and distinctively referred to by a specific address; thus, according to the context an address and a location may be interchangeably referred to.

In the context of the present disclosure, without limiting, a flag implies a data element indicating alternative states or statuses. Generally, without limiting, a flag is implemented as a bit, yet in cases such as where data size is not restrictive or prohibitive a flag may be implemented as a nibble or a byte.

A flag may be embedded in and/or associated with and/or linked to or otherwise coupled to segments of the memory. Generally, a plurality of flags is used so that their states or combinations thereof indicate a status of the location. Setting the status of a location is also referred to as flagging or marking of the location to a status.

In the context of the present disclosure, without limiting, referring to a continuous process implies that the process is operative and/or operated continuously and/or repetitively as opposed to a single pass process.

The terms cited above denote also inflections and conjugates thereof.

One technical problem dealt by the disclosed subject matter is establishing and maintaining in a memory of a flash memory device a mapping of original addresses to other addresses without replicating addresses.

Another technical problem dealt by the disclosed subject matter is multiply updating values in the memory of a flash memory device.

Yet another technical problem dealt by the disclosed subject matter is determining locations in a memory, the locations mapped from a plurality of original addresses, for reducing likelihoods of mapping conflicts caused by mapping original addresses to same locations.

An approach to a technical solution according to the disclosed subject matter is partitioning the address space of a memory to an original address space referred herein also as a main space and to another address space referred herein also as a substitute space.

Each segment of the memory is associated, such by common storage or a linkage, with two flags; one flag denoted as 'in-use' and indicative in the 'on' state that the segment is currently being used for storing data written thereto, and the other flag denoted as 'rejected' is indicative such as in the on state that the segment is currently not usable such as not viable for mapping addresses thereto or for storing values. As in an originally provided memory, when the two flags are both in the 'off' state, it is indicative that the segments are empty and free for writing therein.

When an original location in the main space has to be mapped to a location in the substitute space, such as due to having to be erased for updating, an address in the substitute space is evaluated by a manner or a mechanism for distributing the evaluated addresses sparsely to avoid, or at least reduce the likelihood, of duplicating mapping of the original addresses in the substitute space. For example, using positions separation techniques or any other suitable technique or a mechanism such as a Linear Feedback Shift Register (LFDR), yet with a provision for reversal or reconstruction the operations thereof to identify previous location from which a location has originated. For mapping addresses in the main space to the substitute space the position separation techniques or functions generate or evaluate for original addresses one or more locations in the substitute space for mapping thereto the original addresses, the one or more locations respective to each original address is also referred to as a path.

Thereafter, in case a free segment or a location is found in the substitute space, i.e. the 'in-use' and 'rejected' flags are both off, the updated value is written to the free location and the 'in-use' flag is set as on state, and the 'rejected' flag remains in the off state, and the segment in the main space from which the value was updated is flagged as 'rejected' and may be is erased at one occasion or another.

Otherwise, in case the evaluated address in the substitute space is occupied with a value, i.e. the 'in-use' flag is on, meaning that the evaluated address in the substitute space has already been mapped from the main space and thus a mapping collision or conflict is imminent. Consequently, a subsequent addresses in the substitute space are evaluated as described above until a free location is found and the value in the location where the collision was imminent is copied to the newly found free location, and segment in which the collision was imminent is flagged as 'rejected'.

Additionally, the location that was to be updated is written or scheduled to be written in an empty location evaluated in the substitute space by the mechanism such as described above.

The description above exemplified updating a value in the main space and the same rationale is applied for updating in the values in the substitute space.

Accordingly, as updating of values in the memory repeatedly proceeds, in a phase thereof the memory is generally made up of locations marked as empty that are candidates for writing therein, and occupied locations that were already written therein, and rejected locations denoting locations that were exhausted and are now, at least for the time being, are disqualified for mapping. The differently marked locations in evaluated paths may be regarded to form tracks that try seeking routes disjoint from each other in order to avoid conflicting mapping of addresses in the main space within the practically limited address space of the substitute space.

The flags described above serve as a non-limiting example for marking or flagging a location of the memory, and other methods may be used. For instance, the combinations of the flags may differ, or data constructs having three states to denote the mutually exclusive empty, in-use and rejected statuses, or a lookup table may be used such as in an area of static memory as SRAM (static random-access memory) embedded in or linked with the flash memory.

A potential technical effect of the disclosed subject matter is a multiply-writable processor-controlled flash memory device with address mapping endeavoring to avoid conflicts therebetween to reduce erasures and thus, consequently, effectively employing the limited capacity of the memory.

A general non-limiting presentation of practicing the present disclosure is given below, outlining exemplary practice of embodiments of the present disclosure and providing a constructive basis for variant and/or alternative and/or divergent embodiments, some of which are subsequently described.

FIG. 1 schematically illustrates a layout 100 for mapping management in a flash memory, according to exemplary embodiments of the disclosed subject matter.

The following descriptions with respect to layout 100 is by way of example for conveying principles of operations without implying any restrictions or limitations.

Layout 100 schematically exemplifies a main space 102 with original locations at original addresses, and a substitute space 104 of locations at addresses mapped and/or basically mappable from original addresses in main space 102.

All the locations both in main space 102 and substitute space 104 can be flagged or marked, such as by flags or other constructs, to be in 3 mutually exclusive statuses. In order to augment clarity and comprehension, the statuses are denoted as empty or as in-use or as rejected, where all the locations are preset and/or initialized to an empty status meaning that the locations are not used any may be subsequently written therein.

Various locations in main space 102 are illustrated by circles with capital letters A . . . C, referred to as location A to location C, respectively, and denoted also as original location 112 . . . original location 116, respectively. Likewise, various locations in substitute space 104 are illustrated by circles with lower-case letters a . . . y, referred to as location a to location y, respectively, and denoted also as mapped location 122a to mapped location 122y, respectively, so that any of location A to location C and location a to location y stands for a location or an address of the location and/or of a segment in the memory.

An arrow 124a schematically illustrates locations in substitute space 104 as successively evaluated for mapping from in main space 102 as further described below.

Likewise, an arrow 124b and an arrow 124c schematically illustrate locations successively evaluated for mapping from location B and C, respectively. Arrow 124a, 124b and arrow 124c, without limiting, are also collectively referred to as an arrow 124.

For brevity, locations may be referred to by the letters thereof, for example, location A may be referred to barely by A, and so forth.

In some embodiments or by way of example, an algorithmic process is provided that is operative to generate for each address in main space 102 a sequence of addresses in substitute space 104 that is associated with and headed by said address in main space 102 to form a trail or locations referred to as a path. For example, the sequence A, p, q, l, x, s and b is a path associated with A and further headed by A, or, for example, the sequence C, q, p, x, s, e and l is a path associated with C and further headed by C.

The algorithmic process, also denoted as a path function, may be characterized as Path(A)=[p, q, l, x . . . ] that denotes successive locations generated from and associated with A, and likewise successive locations from location B and C are characterized Path(B)=[i, r, p, m . . . ] and Path(C>[q, p, x, s . . . ] according to the example of layout 100, where the ellipses ( . . . ) in function Path function indicate possible further and/or other and/or alternative successive evaluations from main space 102 to substitute space 104.

The path functions are configured to aim at generating paths separated from each other in order to avoid or prevent mapping conflicts from whichever location in main space 102. Yet, however, such as due to the limited capacity of substitute space 104 and/or to simplify or enhance the process, paths associated with different addresses in main space 102 are not necessarily isolated from each other so that some of the generatable addresses in substitute space 104 may refer to the same location. For example, location p is generated from both A. B and C, and x is generated from both A and C.

The generated paths can be reversed and traced backwards or reconstructed to find or identify for each location thereof the earlier preceding location down to the original locations with which the path is associated the identifying the locations in main space 102 from which the path originated.

Contrary to simplistic cases where data that have been written in main space 102 in locations marked as empty and where data in main space 102 is intact, generally or typically data in main space 102 have to be updated.

Assuming, for simplicity, a preliminary state where no location in substitute space 104 has yet been written with data, namely, all the locations in substitute space 104 are marked as empty. Thus, responsive to an attempt to update a value in a location in main space 102 a location is found in substitute space 104 according to the Path function and the updated value is written therein and the location is marked as in-use, and consequently said location in main space 102 is marked as rejected.

Thereafter, generally, the value written in substitute space 104 may be required to be updated, and therefore a location is found in substitute space 104 according to the Path function and the updated value is written therein and the found location is marked as in-use, and consequently the previous location in substitute space 104 is marked as rejected.

Thus, in simplistic illustrative cases updating locations in main space 102 and substitute space 104 are principally analogous, provided that no locations marked as rejected and in-use are encountered by the Path function.

However, as updating of the memory repeatedly proceeds then the simple preliminary arrangement of an extensive majority of locations marked as empty and just a minority of separated locations marked as in-use and rejected is disrupted, the handling of the memory is elaborated as further described below.

Thus in order to update a value in a location in a path a search is conducted in substitute space 104 in successive locations determined by the Path function in order to find a location marked as empty. During the search, encountered locations marked as rejected, if any, are skipped and the search continues until either a location marked as empty is found or a location marked as in-use is uncounted.

In case a location marked as empty is found, the updated value is written in the found location which is also marked as in-use, while the location which stored the value to be updated is marked as rejected.

Alternatively, in case a location marked as in-use is encountered in the search —implying that the encountered location has already been mapped from a location in main space 102—the encountered location is marked as rejected and the associated address of the location in main space 102 is determined together with the value in the encountered location are provisionally preserved such as by an auxiliary storage, and ensuing updating by the preserved data are scheduled or queued as described below. Subsequently, the search proceeds until a location marked as empty is found and the updated value is written in the found location which is also marked as in-use, while the location which stored the value to be updated is marked as rejected.

Subsequently, the scheduled or queued updating operation are carried out by searching in substitute space 104 according to the Path function from the associated preserved address of main space 102—skipping possible locations marked as rejected—till a location marked as empty if found. The preserved value is written in the found location that is also marked as in-used.

Yet, during the proceeding search other locations marked as in-used may be encountered, and additionally to marking the encountered locations as rejected the associated address of the locations in main space 102 are determined together with the values in the encountered locations and are provisionally preserved. Further, as described above, ensuing updating by the preserved data are scheduled or queued. The updating operations are carried out when proceeding search has found locations marked as empty. Yet, the same rationale is applied if during the search responsive to executing the updating ensuing operation locations marked as in-used are encountered, and the updating operations are concluded when all the value in encountered locations marked as in-use as well as the valued to be updated in the path are stored in location marked as empty.

In some embodiments, the locations in the location in main space 102 are not preserved since these locations may be determined as noted above.

Accordingly, following the example of layout 100, assuming that any one of location A to location C are updated, that is, the original location A to location C are mapped to location p, i and q, respectively.

Subsequently, by way of example, the data respective to C is to be updated, namely location q mapped from C is to be updated. Using the Path function it is found that the next location is p, however p is occupied with data derived from A as determined by the path reversal. Therefore, the data at p is scheduled for a later writing and p is marked as rejected.

The next location after p according to the Path function is x which is found as free, and, therefore, the data of C from in q is moved to x and consequently q is marked as rejected.

According to the Path function a search from A proceeds while skipping locations p and q which are flagged as rejected thus finding location l as a free location, and the scheduled write for the data of A—formerly acquired from p—is written in l.

Subsequently, by way of example, the data respective to B are to be updated, and thus location i is mapped from B to r thereby marking I as rejected. Accordingly, for further updating B, a search is conducted according to the Path function from B to p, the latter is identified as already flagged as rejected and thus skipped. The search proceeds to m that is found to be free and the data respective to B as updated is written in m, thereby flagging r as rejected.

It noted that and emphasized that a path is generated in a manner that facilitates backtracking or reversal of addresses thereon towards the original address in main space 102.

In some embodiments the Path function is configured for reversal such that for a given location previous locations on a path can be reconstructed or reversely generated.

In some embodiments, the path function is implemented as LFDR that is previously cited and by way of example assumed herein. Namely, the LFDR is generally formed as:

$x$=left_shift(right_shift($x$)).

Thus, a path having a length by a count of location thereof can be retraced of reconstructed from a location on a path at the end of the path by iterating through all paths with increasing lengths ending at the given location and having.

In some embodiments an original location in the main space with which a path is associated may be found by successively iterating on the path and skipping location marked as rejected in a reverse manner as mapping in the memory. For example, then address in the main space is identified by repeatedly checking all addresses in the main space for which the associated path having a successively increasing length from 1 onwards that ends at the location S, wherein the check comprises verifying that the path constitutes a location marked as in use possibly preceded by a series of locations marked as rejected.

FIG. 2 outlines operations 200 in management of addresses mapping in device of a flash memory, according to exemplary embodiments of the disclosed subject matter.

Principally operations 200 outline a repetitive and/or iterative process illustrating the basic operations thereof, where, for clarity and further for inherent rendering limitations, possible recurring operational sections are not illustrated and/or repeated.

For clarity it is noted that circles with letters as labels indicate continuations over pages and circles with diamond symbol denote temporary halts or breaks which are resumed anew in operation 201.

In operation 202 the address space of the flash memory is separately designated as a main space and a substitute space.

In operation 204 a function also referred to a Path function is provided and operative to generate for each address in the main space a sequence of addresses in the substitute space that is associated with said address, and each sequence is inclusive of and headed by said address that for clarity and convenience referred to as a path. The function is further operative such that paths associated with different addresses in the main space are at least to some extent separate from other paths.

The address space comprises addressable locations, each location may be denotable by at least three statuses of empty, in-use or rejected, as marked or flagged, where initially all the locations are marked as empty.

In operation 201 it is checked whether updating and/or attempt to update a value stored in a location on a path has occurred.

If not, operation 201 is started anew, for example after waiting according to a timing rime and/or responsive to an event such as an attempt to access the memory or to update a location therein.

Otherwise, responsive to updating and/or attempting to update a value in a location, in operation 206 said location is marked as rejected.

Subsequently, in operation 208 the substitute space is successively searched by locations thereof along the path as generated by the Path function.

Subsequently, in operation 210 it is checked whether a location marked as in-use is encountered in the search till a location marked as empty is found.

If negative, that is a location marked as in-use is not encountered, then in operation 212 the updated value is written in the found location that is marked as empty.

The updated value may be me obtained, for example, by reading the value in said location on the path and storing and updating in a scratch or temporary storage, and the updated value is then written in the memory. Optionally or alternatively, other methods may be used such using registers or static storage for updating the value before writing in the memory.

Subsequently, in operation 214 the found location is marked as in-use, and then the process reverts back to operation 201.

Alternatively, if a location marked as in-use is encountered in the search then in operation 216 the address in the main space which said location is associated with is determined.

Subsequently, in operation 218 the data stored at said encountered location is temporarily retained.

In operation 220 said encountered location is marked as rejected.

Thereafter, in operation 224 the process proceeding in successively searching in the substitute space along the path as determined by the Path function till a location marked as empty is found.

It is noted that during the search one or more occurrences of locations market as in-use may be encountered but, as noted above, such complexities are not described herein and the handling thereof may be directly and/or inherently deduced from the handling a single occurrence.

Subsequently, in operation 226 the updated value is written in the found location marked as empty. Notes regarding writing updated values were provided along with the description of operation 212 above.

In operation 228 the found location is marked as in-use.

In operation 230 a search along a path headed by the previously determined address in the main space is started and conducted till a new location marked as empty is found.

It is noted that during the search one or more occurrences of locations market as in-use may be encountered but, as noted above are not managed herein and the handling thereof may be directly and/or inherently deduced from the handling a single occurrence.

In operation 232 the retained data is written in the location marked as empty, and in operation 234 the newly found location is marked as in-use, and then the process reverts back to operation 201.

Some notes regarding the memory management are due and/or applicable as presented hereinbelow.

The partitioning of the memory to a main space and a substitute space does not necessarily mean that no space is left. Rather, in some embodiments, a memory space is allocated for the management of the flash memory, optionally in cooperation with a controller of the flash memory, either internal and/or external thereto.

It is emphasized that the partitioning of the memory to a main space and a substitute space is not necessarily a physical and/or a mechanical and/or an electrical or electronical division but, rather, parts of the memory may be linked therebetween in any suitable manner, for example, by connectors or by induction.

In some embodiments, successive locations in the substitute space are determined such as by the Path function. Yet, other techniques may be used to find successive locations or addresses, either analytically or heuristically, under the provision that the addresses in the substitute space associated with one address in the main space are disposed to separate from addresses associated with a second address in the main space to avoid mapping conflicts or collisions, and that the addresses may be backtracked such as to find the previous locations down to the original ones. For example, reversing the analytical procedure or keeping track in a memory space such as by indexes or hash tables.

It is noted and emphasized that a flash memory is an article of manufacturing comprising electronic circuitries and generally also a processor embedded therein operative as a controller, and that the memory management according to the present disclosure is carried out by the embedded processor and/or by an external processor operative with the memory.

It noted that locations marked as rejected may me subsequently reclaimed for later use, for example, segments or blocks of locations marked as rejected are erased and thus reclaimed for writing.

For clarity, it is noted that referring to a location on a path or in a path implies a location along a path inclusive of the location in the main space heading the path.

There is thus provided according to the present disclosure a method for data management in a device having a flash memory and capable of multiple overwrites without erasing, and operative in an address space of the flash memory formed as an array of locations respective to addresses, each of the locations having statuses that can be marked as either "empty" or "in use" or "rejected" and entirely initialized to the empty status, the method comprising separately designating in the address space a main space and a substitute space exclusively of each other, where locations respective to addresses in the substitute space may serve as substitute locations for addresses in the main space, providing a function operative to generate for each address in the main space a sequence of addresses in the substitute space, each sequence inclusive of and headed by the said address in the main space is referred to as a path, the function further operative such that paths generated for different addresses in the main space are not necessarily isolated from each other so that some paths may have some shared locations, responsive to attempting to read a value stored in a location respective to an address in the main space, searching for the first location not marked as rejected on a path generated for the said address—the searched for location being a current substitute location for the said address—and returning the value stored in the current substitute location as the value for said address in the main space, responsive to attempting to update a value stored in a location respective to an address in the main space, marking the current substitute location for this address as rejected, and further searching in the substitute space along the path for a new substitute location, and if no location marked as in use is encountered till a location marked as empty is found, then consequently writing the updated value in the found location marked as empty and marking the found location as in use, thus making this new location the current substitute location for the said address in the main space, otherwise, if during the search a location marked as in use is encountered, then determining the address in the main space for which the encountered location serves as the current substitute location and temporarily purging the encountered data from the encountered location while retaining the pair of address and stored data of the encountered location for future processing and marking said encountered location as rejected, and proceeding with the search along the path, thereafter commencing the search for new substitute locations for all purged pairs of addresses and data, and thus the flash memory device provides that the path in the substitute space headed by an address in the main space is made up of a location marked as in use, possibly preceded by a series of locations marked as rejected, where the location marked as in use serving as a unique substitutional location for the location respective to the address in the main space at the head of the path, and wherein the method is continuously carried out by at least a processing component embedded in the device.

In some embodiments, the paths are generated by the function in such a manner that the paths are reversible, allowing to calculate for each location in the substitute space that lies on a path the address in the main space that heads the path.

In some embodiments, the paths are generated by said provided function such that the addresses in the main space for which a path of length L ends at the location S can be calculated.

In some embodiments, the identification of an address in the main space that heads a path is carried out by repeatedly checking all addresses in the main space heading a path having a successively increasing length from 1 onwards that ends at the location S, wherein the check comprises verifying that the path constitutes a location marked as in-use possibly preceded by a series of locations marked as rejected.

It is noted that using terms as 'empty' or 'in-use' or 'rejected' are for clarity and any other terms or indications or constructs that operate as described to distinguish between statuses may be used. Further, a status may be implied from other statuses, for example, if two statuses are marked as non-rejected and not in-use, respectively, then an empty status is implied, rendering a separate status of empty superfluous or not required.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein, ellipsis ( . . . ) between two entities or values denotes an inclusive range of entities or values, respectively. For example, A . . . Z implies all the letters from A to Z, inclusively.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutes and equivalents are not precluded.

APPENDIX

As an appendix to the present disclosure, hereinbelow is presented set of procedures in pseudo code practically self-comprehensible for a person of the art that summarize the memory managementand some auxiliary operations according to exemplary embodiments of the disclosed subject matter.

1. The code depends on variable n_bits_in_the_address, left undefined and defines two arrays of the length 2 n_bits_in_the_address, one serving as the main memory array and the next one as the substitutional memory array. So, in this case, the length of both arrays is equal, but in practice they may be different

```
main_memory = ['empty']*(1 << n_bits_in_the_address)
subs_memory = ['empty']*(1 << n_bits_in_the_address)
```

APPENDIX-continued

As an appendix to the present disclosure, hereinbelow is presented set of procedures in pseudo code practically self-comprehensible for a person of the art that summarize the memory managementand some auxiliary operations according to exemplary embodiments of the disclosed subject matter.

```
    2.  To make a path pseudo-random, to avoid a situation that two
        paths collide and then proceed in the same way we use an
        LFSR defined by the polynomial p
p = (1 << n_bits_in_the_address) | 0x13
def left_shift(x):
    x <<= 1
    if x & (1 << n_bits_in_the_address):
        x ^= p
    return x
def right_shift(x):
    if x & 1:
        x ^= p
    x >>= 1
    return x
    3.  path_from is a function returning a sequence of addresses in
        the substitution memory constituting the path for the given
        address in the main memory
def path_from(address, length = MAX_LEN):
    for index in range(length):
        yield address
        address = right_shift(address) ^ index
    4.  path_to is a function returning the address in the main memory
        and its path in the substitution memory so that at the given
        length it conies to the given address in the substitution
        memory
def path_to(address, length):
    path = { }
    for index in reversed(range(length - 1)):
        address = left_shift(address ^ index)
        path.append(address)
    path.reverse( )
    #the path starts in the main_memory at 'address'
    return address, path
def read(address):
    data = main memory[address]
    if data == 'rejected':
        for addr in path_from(address):
            data = subs memory[addr]
            if data != 'rejected': break
    return data
def origins(address):
    # we are looking for all possible start addresses in
    # main_memory that now map to the 'address'
    # namely, they pass through annuled rejected locations only
    path_len = 0
    while True:
        path_len += 1
        start_addr, path = path_to(address, path_len)
        if main_memory[start addr] != 'rejected':
            continue
        if all(subs_memory[addr] == 'rejected' for addr in path):
            yield start_addr
def write(queue):
    # queue is a dictionary of (address: data) to be written.
    # the algorithm assumes that all addresses in the queue
    # are already deleted from the memory
    if not queue: return
    address, data = queue.popitem( )
    if main_memory[address] == 'empty';
        main_memory[address] = data
        return write(queue)
    else:
        main_memory[address] = 'rejected'
        for addr in path_from(address):
            other_data = subs_memory[addr]
            if other_data == 'empty':
                # program the data in the subs_memory
                subs_memory[addr] = data
                return write (queue)
            if other data == 'rejected':
                continue
            #The addr contains other data, Find its origin, delete it
            # and put (origin: other data) to the queue,
            # proceed along the path
            for origin in origins(addr):
                # the address and all other addresses in the queue can
                # look as an origin, but they are not
                if origin != address and origin not in queue:
                    subs_memory[addr] = 'rejected'
                    queue[origin] = other_data
                    queue[address] = data
                    break
            # if reached here, there is no more empty locations on the path
            return queue
```

The invention claimed is:

1. A method for data management in a device having a flash memory and capable of multiple overwrites without erasing, and operative in an address space of the flash memory formed as an array of locations respective to addresses, each of the locations having statuses that can be marked as either "empty" or "in-use" or "rejected" and entirely initialized to the empty status, the method comprising:

separately designating in the address space a main space and a substitute space exclusively of each other, where locations respective to addresses in the substitute space may serve as substitute locations for addresses in the main space;

providing a function operative to generate for each address in the main space a sequence of addresses in the substitute space, each sequence inclusive of and headed by the said address in the main space is referred to as a path, the function further operative such that paths generated for different addresses in the main space are not necessarily isolated from each other so that some paths may have some shared locations;

responsive to attempting to read a value stored in a location respective to an address in the main space, searching for a first location not marked as rejected on a path generated for the said address, the searched-for location being a current substitute location for the said address, and returning the value stored in the current substitute location as the value for said address in the main space;

responsive to attempting to update a value stored in a location respective to an address in the main space, marking the current substitute location for this address as rejected, and further searching in the substitute space along the path for a new substitute location, and if no location marked as in-use is encountered till a location marked as empty is found, then consequently writing the updated value in the found location marked as empty and marking the found location as in-use, thus making this new location the current substitute location for the said address in the main space, otherwise, if during the search a location marked as in-use is encountered, then determining the address in the main space for which the encountered location serves as the current substitute location and temporarily purging the encountered data from the encountered location while retaining the pair of address and stored data of the encountered location for future processing and marking said encountered location as rejected, and proceeding with the search along the path, thereafter commencing the search for new substitute locations for all purged pairs of addresses and data; and thus the flash memory device provides that the path in the substitute space headed by an address in the main space is made up of a location marked as in-use, possibly preceded by a series of locations marked as rejected, where the location marked as in-use serving as a unique substitutional location for the location respective to the address in the main space at the head of the path, wherein the method is continuously carried out by at least a processing component embedded in the device.

2. The method according to claim 1, wherein the paths are generated by the function in such a manner that the paths are reversible, allowing to calculate for each location in the substitute space that lies on a path the address in the main space that heads the path.

3. The method according to claim 2, wherein the paths are generated by said provided function such that the addresses in the main space for which a path of length L ends at a location S can be calculated.

4. The method according to claim 3, wherein the identification of an address in the main space that heads a path is carried out by repeatedly checking all addresses in the main space heading a path having a successively increasing length from 1 onwards that ends at the location S, wherein the check comprises verifying that the path constitutes a location marked as in-use possibly preceded by a series of locations marked as rejected.

5. A device having a flash memory and capable of multiple overwrites without erasing, and operative in an address space of the flash memory formed as an array of locations respective to addresses, each of the locations having statuses that can be marked as either "empty" or "in-use" or "rejected" and entirely initialized to the empty status, the device comprising an embedded processing component, the processing component configured to perform the following operations:

separately designate in the address space a main space and a substitute space exclusively of each other, where locations respective to addresses in the substitute space may serve as substitute locations for addresses in the main space;

provide a function operative to generate for each address in the main space a sequence of addresses in the substitute space, each sequence inclusive of and headed by the said address in the main space is referred to as a path, the function further operative such that paths generated for different addresses in the main space are not necessarily isolated from each other so that some paths may have some shared locations;

responsive to attempting to read a value stored in a location respective to an address in the main space, search for a first location not marked as rejected on a path generated for the said address, the searched-for location being a current substitute location for the said address, and return the value stored in the current substitute location as the value for said address in the main space;

responsive to attempting to update a value stored in a location respective to an address in the main space, mark the current substitute location for this address as rejected, and further search in the substitute space along the path for a new substitute location, and if no location marked as in-use is encountered till a location marked as empty is found, then consequently write the updated value in the found location marked as empty and mark the found location as in-use, thus making this new location the current substitute location for the said address in the main space, otherwise, if during the search a location marked as in-use is encountered, then determine the address in the main space for which the encountered location serves as the current substitute location and temporarily purge the encountered data from the encountered location while retaining the pair of address and stored data of the encountered location for future processing and mark said encountered location as rejected, and proceed with the search along the path, thereafter commencing the search for new substitute locations for all purged pairs of addresses and data; and thus the flash memory device provides that the path in the substitute space headed by an address in the main space is made up of a location marked as in-use, possibly preceded by a series of locations marked as rejected, where the location marked as in-use serving as a unique substitutional location for the location respective to the address in the main space at the head of the path.

* * * * *